Patented Aug. 29, 1950

2,520,264

UNITED STATES PATENT OFFICE 2,520,264

SUBSTITUTED 3,1-BENZ-2,3,4,5-TETRA-HYDROAZEPINES

Lewis A. Walter, East Orange, N. J., assignor to Maltbie Laboratories, Inc., a corporation of New Jersey No Drawing. Application August 26, 1947, Serial No. 770,747

4 Claims. (Cl. 260—239)

My present invention relates to new and useful compositions of matter, namely, those consisting wholly or in part of N-alkyl and N-aralkyl substituted 3,1-benz-2,3,4,5 - tetrahydroazepines.

These compounds are represented by the formula,

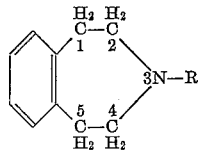

wherein R represents saturated lower alkyl, allyl and phenalkyl groups. Being organic bases, these compounds readily form salts with organic and inorganic acids. These novel compounds, which may be considered to be amines, and their salts, when tested pharmacologically, have been found to possess valuable analgesic properties. They are also useful as intermediates in organic syntheses.

The compounds may be prepared by reacting 3,1-benz-2,3,4,5-tetrahydroazepine with alkyl and aralkyl halides or sulfates as hereinafter described.

Following the preparation of the substituted compound as aforesaid, it may be desirable to prepare salts thereof such as hydrochloride, sulfate, phosphate, acetate, citrate and possibly others, such salts being those of known non-toxic acids. These salts may be prepared from the substituted compounds in the usual manner as hereinafter set forth.

The following specific examples are illustrative of the novel compounds according to my invention, and of suitable methods for their preparation.

Example 1

Twenty grams of 3,1-benz-2,3,4,5-tetrahydroazepine, prepared by the hydrogenation of O-xylylene dicyanide was made just acid to Congo red with concentrated hydrochloric acid, 50 ml. of 37% Formalin was added and the mixture was placed in a sealed tube and heated at 135–140° C. for eight hours. The contents of the tube were then made strongly basic with sodium hydroxide, and the amine layer was separated and distilled to give N-methyl-3,1-benz-2,3,4,5-tetrahydroazepine, a clear colorless liquid boiling at 73–75° C. at 2 mm. The hydrochloride salt was prepared by passing dry hydrogen chloride into an ether solution of the amine. This salt was crystallized from absolute alcohol and melted at 244–245° C. uncorrected.

Example 2

Twenty-nine grams of 3,1-benz-2,3,4,5-tetrahydroazepine, 10.5 g. of ethyl bromide and 50 ml. of dry toluene were placed in a tightly stoppered flask and kept at room temperature until no more 3,1-benz-2,3,4,5-tetrahydroazepine hydrobromide precipitated. This salt was filtered off, and the toluene solution was shaken with 5 ml. of acetic anhydride. The solution was next shaken with dilute alkali until the excess acetic anhydride was decomposed. The toluene layer was then separated and fractionally distilled to give N-ethyl-3,1-benz-2,3,4,5-tetrahydroazepine, a clear colorless liquid boiling at 90–100° C. at 3 mm. This compound was converted to the hydrochloride salt by the procedure described in Example 1. The salt was non-hydroscopic and melted at 238–239° C. uncorrected.

Example 3

Twenty-nine grams of 3,1-benz-2,3,4,5-tetrahydroazepine, 12 g. of isopropyl bromide and 75 ml. of dry toluene were sealed in a tube and heated at 100° C. for thirty hours. The reaction mixture was worked upon by the precedure described in Example 2, to give N-isopropyl-3,1-benz-2,3,4,5-tetrahydroazepine, a clear colorless liquid boiling at 95–105° C. at 2 mm. The hydrochloride salt of this compound melts at 260–261° C. uncorrected.

The following N-substituted 3,1-benz-2,3,4,5-tetrahydroazepines were also prepared, using two molecular equivalents of 3,1-benz-2,3,4,5-tetrahydroazepine and one molecular equivalent of the appropriate alkyl or aralkyl halide by the procedure described in Example 2.

| N-substituent | B. P., °C., uncorrected | M. P. hydrochloride salt, °C., uncorrected |
|---|---|---|
| Allyl | 97–102° at 1 mm | 210–212°. |
| n-Propyl | 95–105° at 1.5–2 mm | 236–237°. |
| n-Butyl | 107–110° at 2–3 mm | 226–2227°. |
| Benzyl | | 248–250°. |
| β-Phenylethyl | | 260–263° decomposition. |
| γ-Phenylpropyl | | 211.5–213°. |

What is claimed is:

1. A compound of the class consisting of amines of the formula

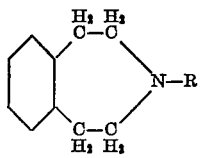

where R is selected from the group consisting of saturated lower alkyl, allyl, and phenalkyl radicals; and the water-soluble salts of said amines with non-toxic acids; said compounds having valuable pharmaceutical properties.

2. A compound having the formula

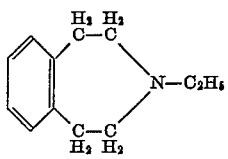

3. A compound having the formula

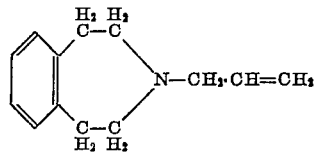

4. A compound having the formula

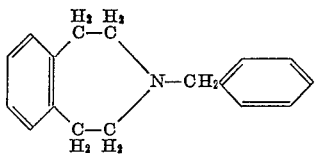

LEWIS A. WALTER.

REFERENCES CITED

The following references are of record in the file of this patent:

Braun et al., Berichte, vol. 58-B, pp. 2765-2767 (1925).

Buck et al., J. Am. Chem. Soc., vol. 60, pp. 2101-2103 (1938).

Certificate of Correction

Patent No. 2,520,264                                      August 29, 1950

LEWIS A. WALTER

It is hereby certified that error appears in the printed specification of the above numbered patent requiring correction as follows:

Column 2, line 48, in the table, third column thereof, for "226–2227°" read *226–227°*;

and that the said Letters Patent should be read as corrected above, so that the same may conform to the record of the case in the Patent Office.

Signed and sealed this 21st day of November, A. D. 1950.

[SEAL]

THOMAS F. MURPHY,
*Assistant Commissioner of Patents.*